March 5, 1968   B. R. ABBOTT   3,371,868
FAUCET FOUNTAIN
Filed July 18, 1966

BOBBY R. ABBOTT
    INVENTOR.

BY

Robert K. Rhea
        AGENT

United States Patent Office 3,371,868
Patented Mar. 5, 1968

3,371,868
FAUCET FOUNTAIN
Bobby R. Abbott, 3808 SW. 40th Place,
Oklahoma City, Okla. 73119
Filed July 18, 1966, Ser. No. 566,111
5 Claims. (Cl. 239—27)

The present invention relates to fountains and more particularly to an attachment for faucets having a threaded discharge end for forming a fountain.

The prior art discloses a number of faucet fountains most of which disclose a unit connected with the ejection end of the faucet which, by a tube, provides an upward flow of water remote from the faucet. The devices generally are objectionable in appearance in that they are generally unsightly and difficult to maintain in a sanitary condition.

It is, therefore, the principal object to provide a sanitary faucet fountain which is substantially equal in size to the ejection end of the faucet and forms a relatively short continuation thereof.

Another object is to provide a faucet fountain which does not hinder the normal operation of a water faucet and which may be readily positioned in drinking fountain position and returned to an inoperative position.

Another object is to provide a fountain attachment for water faucets which is economical to produce, simple to operate and will not be unsightly when attached to a faucet.

Still another object is to provide a fountain which screws onto the faucet and is provided with means for other attachments thereto.

Still another object is to provide a fountain for directing a stream of water upwardly toward the user when desired while the normal downflow of other water is unimpeded.

The present invention accomplishes these and other objects by connecting a tubular member to the outlet end of a faucet. A sleeve rotatively surrounds the tubular member. A window is formed through the wall of the sleeve and tubular member through which a small tube, hingedly mounted within the tubular member, projects when the openings of the sleeve and tubular member are in register.

Other objects will be apparent from the following description when taken in conjunction with the accompanying single sheet of drawings, wherein.

Like characters of reference designate like parts in those figures of the drawings in which they occur.

In the drawings.

Figure 1:
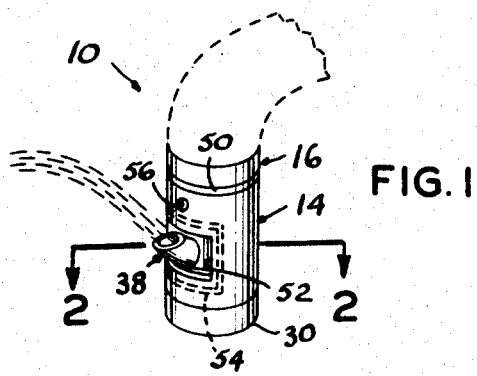
FIGURE 1 is a perspective view of the device in operative position illustrating, by dotted lines, a supporting faucet.

The reference numeral 10 indicates the ejection outlet end of a conventional faucet provided with threads 12 for the reception of an aerator, or the like.

The numeral 14 indicates the device, as a whole, which is cylindrical in general configuration. The device 14 is connected to the faucet threads 12 by an adapter 16 having internal threads at one end for connection with the faucet threads 12. Obviously the adapter may be provided with external threads for connection with faucets having internal threads. The adapter has a diametrically reduced end portion 18 opposite its threaded end. A tubular body 20, having a thickened wall portion 22, at one end, closely surrounds the reduced end portion 18 of the adapter and is secured thereto by set screws 24. An O-ring 26, carried by the adapter end portion 18, seals the body 20 with the adapter. The depending end portion of the body is provided with external threads 28 for the reception of a conventional aerator 30, if desired. A window 32 is cut through the wall of the body. The window 32 is shown rectangular but may be of any other configuration if desired. A door 34 is hingedly connected at one side to the inner wall surface of the body by a vertical hinge pin 36. The door 34 is of greater surface area than the opening 32 and is formed on an arc contiguously contacting the inner wall surface around the opening 32. A hinge spring 44 surrounds the hinge pin 36 and normally maintains the door 34 in closed position.

A relatively small conduit 38 extends through the door 34 and is turned arcuately upward at its respective open ends. The outer shorter end portion 40 of the conduit is disposed adjacent the outer surface of the body 20 while the opposite or inner end portion 42 of the conduit terminates substantially coaxial with the body 20.

A sleeve 46 surrounds the body 20 and is provided at its upper end with an inwardly projecting annular flange 48 which overlies the upper end surface of the body portion 22. A gasket 50 is interposed between the adapter 16 and flanged end portion of the sleeve. The sleeve is provided with an opening or port 52 which mates and mismates with the door opening 32 as the sleeve 46 is manually rotated. The outer surface of the body is provided with a groove surrounding the door opening 32 for receiving packing or gasket means 54 to prevent leakage through the door opening when the door opening and sleeve port are mismated as described hereinbelow.

Operation

Figure 2:
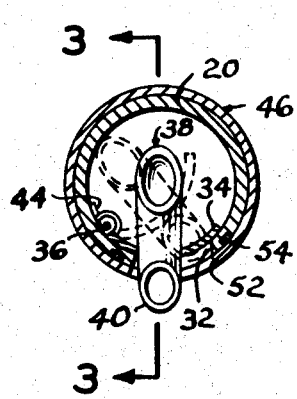
FIGURE 2 is a horizontal cross-sectional view, to a larger scale, taken substantially along the line 2—2 of FIG. 1; and, FIGURE 3 is a vertical cross-sectional view taken substantially along the line 3—3 of FIG. 2.
Figure 3:
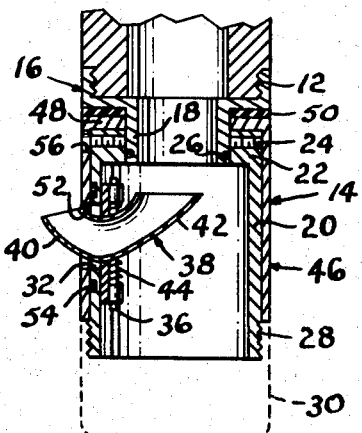

In operation the device 14 is connected to the faucet 10 as described hereinabove. The aerator 30 may be connected to the depending end of the device, if desired. A portion of the water, not shown, flowing through the faucet and body 20 is directed outwardly of the longitudinal axis of the latter by the conduit 38, as shown by dotted lines (FIG. 1). The conduit 38 may be retracted to interrupt the water flow therethrough by manually rotating the sleeve 46 counterclockwise, as viewed in FIG. 2, wherein the wall forming the sleeve port 52 contacts the end portion 40 of the conduit and pivots the door 34 inwardly of the door opening 32, as shown by dotted lines (FIG. 2). In this position all of the water flowing through the faucet passes downwardly in a normal manner. The conduit 38 is again repositioned in drinking fountain position by rotating the sleeve 46, in either direction, so that its port 52 and the door opening 32 are again in register wherein the hinge spring 44 swings the door 34 to a closed position thus positioning the conduit end portion 40 outwardly of the sleeve wall. The sleeve is provided with a small aperture 56 at its upper end portion which may be registered with the set screws 24 for installation and disassembling the device.

Obviously the invention is susceptible to some change or alteration without defeating its practicability, and I therefore do not wish to be confined to the preferred embodiment shown in the drawings and described herein, further than I am limited by the scope of the appended claims.

I claim:
1. A drinking fountain attachment for water faucets, comprising: a tubular body having coupling means at one end for connection with a faucet, said body having an opening in its wall; a door hingedly connected to the inner wall of said body and swingable toward and away from the opening; a conduit projecting through said door, said conduit having one upturned end portion intersecting the stream of water flowing from said faucet when the latter is in use, said conduit having an opposite upturned end portion directing a portion of the stream of water outwardly and upwardly of said body as a drinking fountain stream when the door is in closed position; and means for opening and closing said door.

2. Structure as specified in claim 1 in which the last mentioned means includes a hinge spring normally biasing said door toward a closed position.

3. Structure as specified in claim 2 in which the last mentioned means further includes a sleeve rotatably surrounding said body, said sleeve having a port in its wall mating and mismating with the opening in said body as the sleeve is rotated, whereby the wall of said sleeve defining the port contacts the outwardly and upwardly projecting end portion of said conduit and swings said door to an open position when the sleeve is rotated in one direction.

4. Structure as specified in claim 3 in which the coupling means includes an adapter having an end portion threadedly connected with said faucet and having an opposite end portion projecting into one end portion of said body; and set screws connecting said body to the last mentioned end portion of said adapter.

5. Structure as specified in claim 4 in which said sleeve is provided with an annular flange interposed between said body and said adapter.

References Cited

UNITED STATES PATENTS

| | | | |
|---|---|---|---|
| 3,237,863 | 3/1966 | Wollmershauser | 239—25 |
| 3,335,957 | 8/1967 | Jacobson | 239—25 |

EVERETT W. KIRBY, *Primary Examiner.*